United States Patent
Hoogerbrugge et al.

(10) Patent No.: US 11,783,055 B2
(45) Date of Patent: Oct. 10, 2023

(54) SECURE APPLICATION EXECUTION IN A DATA PROCESSING SYSTEM

(71) Applicant: NXP B.V., Eindhoven (NL)

(72) Inventors: Jan Hoogerbrugge, Helmond (NL); Wilhelmus Petrus Adrianus Johannus Michiels, Reusel (NL); Ad Arts, Heeze (NL)

(73) Assignee: NXP B.V., Eindhoven (NL)

( * ) Notice: Subject to any disclaimer, the term of this patent is extended or adjusted under 35 U.S.C. 154(b) by 362 days.

(21) Appl. No.: 17/079,992

(22) Filed: Oct. 26, 2020

(65) Prior Publication Data
US 2022/0129566 A1   Apr. 28, 2022

(51) Int. Cl.
*G06F 21/60* (2013.01)
*G06N 20/00* (2019.01)

(52) U.S. Cl.
CPC .......... *G06F 21/602* (2013.01); *G06N 20/00* (2019.01)

(58) Field of Classification Search
CPC .............................. G06F 21/602; G06N 20/00
See application file for complete search history.

(56) References Cited

U.S. PATENT DOCUMENTS

2005/0210287 A1* 9/2005 Paatero .................... G06F 21/85
726/5
2010/0017625 A1* 1/2010 Johnson .................. G06F 21/14
713/193
2013/0227704 A1* 8/2013 Boivie .................... G06F 21/54
726/27
2016/0210255 A1* 7/2016 Wicki ................. H04L 12/4625
2018/0276392 A1* 9/2018 Hoogerbrugge ...... H04L 9/3236
(Continued)

FOREIGN PATENT DOCUMENTS

KR        20170095780 A  *  4/2017  ............. G06F 21/51
WO   WO-2016109643 A1  *  7/2016  ......... G06Q 20/3226
WO   WO-2020034098 A1  *  2/2020  ............. G06F 21/57

OTHER PUBLICATIONS

Hoang, Trong-Thuc et al.; "Quick Boot of Trusted Execution Environment With Hardware Accelerators;" IEEE Access vol. 8; Date of Publication Apr. 13, 2020; DOI: 10.1109/ACCESS.2020.2987617.

(Continued)

*Primary Examiner* — Noura Zoubair
*Assistant Examiner* — Thomas A Carnes
(74) *Attorney, Agent, or Firm* — Daniel D. Hill

(57) ABSTRACT

A data processing system includes a rich execution environment, a hardware accelerator, a trusted execution environment, and a memory. The REE includes a processor configured to execute an application. A compute kernel is executed on the hardware accelerator and the compute kernel performs computations for the application. The TEE provides relatively higher security than the REE and includes an accelerator controller for controlling operation of the hardware accelerator. The memory has an unsecure portion coupled to the REE and to the TEE, and a secure portion coupled to only the TEE. The secure portion is relatively more secure than the unsecure portion. Data that is to be accessed and used by the hardware accelerator is stored in the secure portion of the memory. In another embodiment, a method is provided for securely executing an application is the data processing system.

13 Claims, 4 Drawing Sheets

(56) References Cited

U.S. PATENT DOCUMENTS

2021/0165883 A1* 6/2021 Zhang ............... G06F 21/57
2021/0200882 A1* 7/2021 Maor ............... G06F 16/71

OTHER PUBLICATIONS

McGillion, Brian et al.; "Open-TEE—An Open Virtual Trusted Execution Environment;" arXiv:1506.07367v2 (cs.CR]; Jun. 30, 2015.
Volos, Stavros et al.; "Graviton: Trusted Execution Environment on GPUs;" in Proceedings of the 13th USENIX Symposium on Operating Systems Design and Implementation (OSDI '18), Oct. 8-10, 2018, Carlsbad, California.
Zengin, Onur; "Mobile Platform Security: OS Hardening and Trusted Execution Environment;" OWASP Helsinki TEE Chapter Meeting #25 Presentation; Sep. 29, 2014; Helsinki, Finland; https://www.linuxsecrets.com/owasp-wiki/index.php/Helsinki.html.
U.S. Appl. No. 16/752,734; Inventor: Christine Van Vredendaal et al.; "Biometric System And Method For Recognizing A Biometric Characteristic In The Biometric System;" ; filed Jan. 27, 2020.

* cited by examiner

SECURE APPLICATION EXECUTION IN A DATA PROCESSING SYSTEM

BACKGROUND

Field

This disclosure relates generally to data processing, and more particularly, to secure application execution in a data processing system.

Related Art

Some data processing systems include both secure and unsecure processing environments. Typically, applications requiring higher security are processed in the secure environment, while all other applications are processed in the unsecure environment. The secure environment may be referred to as a trusted execution environment (TEE) and the unsecure environment may be referred to as a rich execution environment (REE). The standard way to execute applications on many systems on a chip (SoC) is in the REE. The REE is called "rich" because it can provide a larger set of services to the applications than can the TEE. Besides being rich, the REE is also relatively insecure. The TEE is used to execute applications that operate on confidential data or applications that provide access to higher valued resources. Also, the typical TEE does not include as many processing resources and memory as the REE.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
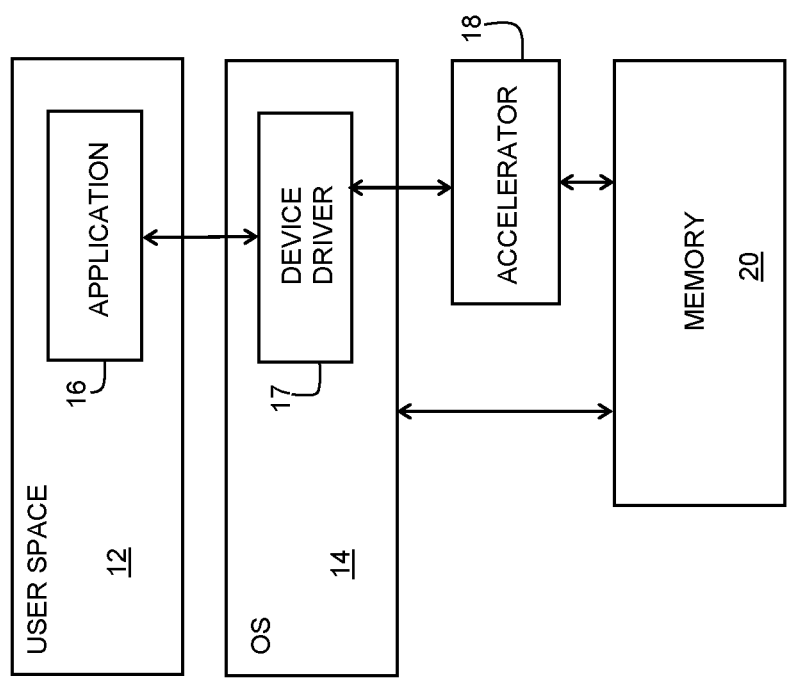
FIG. 1 illustrates an organization of a processing environment in accordance with the prior art.

Generally, there is provided, a data processing system and method for executing relatively complex applications that perform computations on confidential data. The data processing system includes a REE and a TEE. For performance reasons, an application being executed in the REE may make use of one or more compute kernels to perform computations on a hardware accelerator. The compute kernels may be required to make the computations using confidential data. To provide the needed security for computations on the confidential data, an accelerator controller is provided in the TEE for controlling the operations of the hardware accelerator. One or more compute kernels are executed by the hardware accelerator for performing computations on the confidential data. In one embodiment, the accelerator controller may control accesses to a plurality of control registers in the hardware accelerator via a device driver in the TEE. Also, a memory may include an unsecure portion and a secure portion, wherein the secure portion is relatively more secure than the unsecure portion. The secure portion of the memory is under the control of the accelerator controller. The hardware accelerator can only access data from the secure memory portion. When the compute kernel requires the confidential data for computations, access requests to the secure portion of the memory are provided to the accelerator controller. The accelerator controller interprets register write operations so that it can check which data is allowed to be returned to the application in REE user space to prevent an attacker from learning the confidential data.

By restricting access to the plurality of control registers to the accelerator controller, an attacker is prevented from having access to the confidential data used by the hardware accelerator. The data processing system and method allows large complex applications that require some secure processing to be run in a REE using a hardware accelerator without requiring a prohibitively large secure memory or TEE for software execution.

In accordance with an embodiment, there is provided, in a data processing system having a rich execution environment (REE) and a trusted execution environment (TEE), a method including: executing an application in the REE; and executing a compute kernel that operates on data for the application using a hardware accelerator, wherein control of the compute kernel is provided by an accelerator controller in the TEE, and wherein the compute kernel in the REE makes requests to the accelerator controller when requiring access to the hardware accelerator. The application may be a machine learning application. The access to the hardware accelerator may include an access to a plurality of control registers in the hardware accelerator for storing control data for controlling operation of the hardware accelerator. The accelerator controller may interpret write operations to the hardware accelerator. The method may further include storing the data for the application in a secure portion of a memory accessible only by requests provided to the TEE, wherein the secure portion of the memory is more secure than an unsecure portion of the memory, and wherein only the TEE has access to the secure portion of the memory. The method may further include replacing addresses for accessing data in the unsecure portion of the memory with addresses of data in the secure portion of the memory. The method may further include: storing the data for the application encrypted in the unsecure portion of the memory; and decrypting the encrypted data for the application when storing the encrypted data for the application in the secure portion of the memory, wherein decrypting the encrypted data is performed using a key that has been provisioned to the accelerator controller. The method may further include: accepting, by the accelerator controller, input data from the REE for the compute kernel; and storing the input data in the secure portion of the memory. The method may further include selectively providing output data from the secure portion of the memory for storage in the unsecure portion of the memory. Intermediate results from computations by the compute kernel may only be stored in the secure portion of the memory.

In another embodiment, there is provided, a data processing system including: a rich execution environment (REE) having a processor configured to execute an application; a hardware accelerator, wherein a compute kernel is executed on the hardware accelerator, and wherein the compute kernel performs computations for the application; a trusted execution environment (TEE), the TEE providing relatively higher security than the REE, wherein the TEE includes an accelerator controller for controlling operation of the hardware accelerator; and a memory having an unsecure portion coupled to the REE and to the TEE, and a secure portion coupled to only the TEE, wherein the secure portion is relatively more secure than the unsecure portion, and wherein data to be accessed by the hardware accelerator is stored in the secure portion of the memory. The application may be a machine learning application. The hardware accelerator may include a plurality of control registers, and wherein the application in the REE may request access to the plurality of control registers from the accelerator controller. The accelerator controller may accept input data for the hardware accelerator and store the input data in the secure portion of the memory, and wherein data output from the hardware accelerator may be stored in either the unsecure portion of the memory or the secure portion of the memory by the accelerator controller. The data used by the hardware accelerator may be stored in the secure portion of the memory, and wherein the accelerator controller executes memory accesses to the secure portion of the memory on behalf of the hardware accelerator. The accelerator controller may replace addresses that refer to locations of the unsecure portion of the memory with addresses that refer to locations in the secure portion of the memory. The accelerator controller may determine if data read from the secure portion of the memory can be returned to the REE. The read data may be stored encrypted in the unsecure portion of the memory. The encrypted read data may be decrypted before being stored in the secure portion of the memory, and wherein a key for decrypting the encrypted read data may be provisioned to the accelerator controller in the TEE. Intermediate results from the computations by the hardware accelerator may only be stored in the secure portion of the memory.

FIG. 1 illustrates an organization of a processing environment 10 in accordance with the prior art. Processing environment 10 includes user space 12, operating system (OS) 14, application 16, device driver 17, hardware accelerator 18, and memory 20. User space 12 is a part of processing environment 10 that is available for a user to run their applications, such as application 16. Application 16 may be a relatively large complex application that requires a significant number of resources for execution. Processing system 10 may include a number of compute kernels that perform computations needed by application 16. For performance reasons, a hardware accelerator, such as hardware accelerator 18, may be provided to execute one or more compute kernels when running an application. Operating system 14 may include one or more device drivers, such as device driver 17, to control hardware accelerator 18 via a control register interface. When hardware accelerator 18 executes the compute kernel, hardware accelerator 18 reads input data from memory 20. The compute kernel and hardware accelerator 18 both have access to memory 20.

Processing system 10 does not include a TEE and is considered relatively insecure. For this reason, processing system 10 may not be an appropriate system to execute application 16 if application 16 requires confidential data. As an example, application 16 may be a machine learning (ML) model. An ML model may represent a significant investment to create that warrants protection. For example, in a ML model, the weights that were determined during training of the ML model may be treated as confidential because they required a significant amount of labeled training data to compute. However, the ML model may be too large and complex to run in a TEE because the application may require more resources than are typically available in a TEE.

Figure 2:
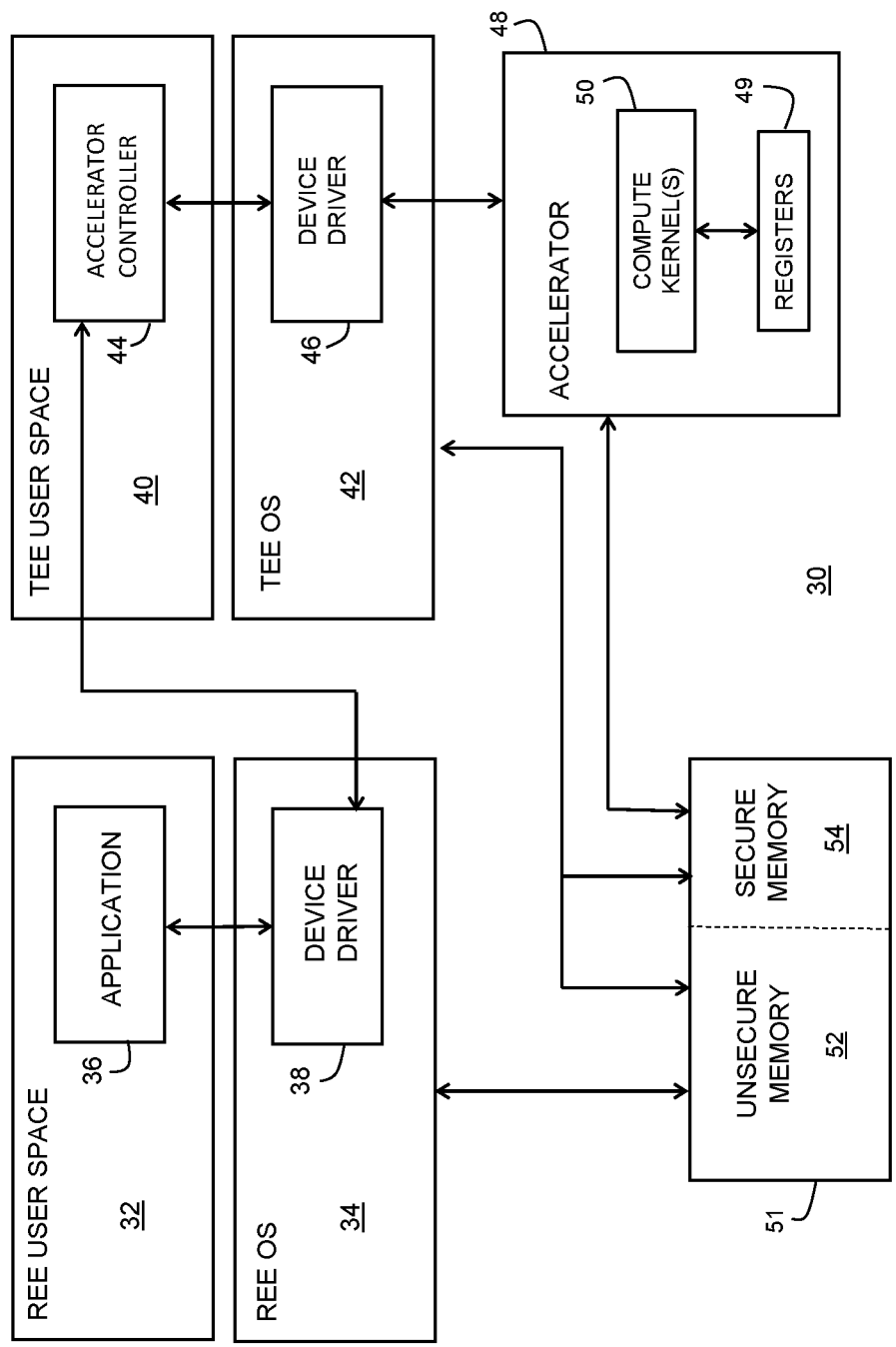
FIG. 2 illustrates an organization of a processing environment in accordance with an embodiment.

FIG. 2 illustrates an organization of processing environment 30 in accordance with an embodiment. Processing system 30 is divided into two parts, an REE and a TEE. The division may be a logical division or a physical division. Processing system 30 provides security for a large complex software application such as an ML model. Specifically, processing system 30 protects confidential data used by the application. Processing environment 30 includes REE user space 32, REE OS 34, TEE user space 40, TEE OS 42, hardware accelerator 48, and memory 50. Application 36 runs in REE user space 32. Application 36 communicates with device driver 38 in REE OS 34. Accelerator controller 44 runs in TEE user space 40, and device driver 46 runs in TEE OS 42. The TEE may be implemented using Trustzone by ARM. Trustzone is architectural support provided by ARM so that developers and designers can implement a TEE based on an ARM processor. ARM's Trustzone is only one example of a TEE that is often used to realize a TEE. Other embodiments may use a different TEE. Device driver 38 is coupled to communicate with accelerator controller 44. Device driver 38 cannot communicate directly with hardware accelerator 48 but must go through accelerator controller 44. In TEE OS 42, device driver 46 is coupled to accelerator controller 44 and hardware accelerator 48.

Hardware accelerator 48 includes one or more compute kernels 50 and a plurality of control registers 49. The one or more compute kernels 50 are executed by hardware accelerator 48 to perform specific computations, such as, e.g., 2d convolution computations in the case of a neural network in a ML model. Memory 51 is partitioned into unsecure memory portion 52 and secure memory portion 54. Division of memory 51 can be a logical division or the memory portions can be physically separate memories. Secure memory portion 54 is relatively more secure than unsecure memory portion 52. REE OS 34 and REE user space 32 have access to unsecure memory portion 52, but do not have access to secure memory portion 54. TEE user space 40 and TEE OS 42 are provided access to both unsecure memory portion 52 and secure memory portion 54. Hardware accelerator 48 is only allowed access to secure memory portion 54. Secure memory portion 54 cannot be accessed by application 36.

Processing system 30 provides security for confidential data used by application 36 running in REE user space 32. Application code 36 remains in REE user space 32. One or more compute kernels 50 run on hardware accelerator 48 and perform computations needed by application 36. The data required by the compute kernels is confidential. The confidential data is stored encrypted in unsecure memory portion 52 and then decrypted when it is moved to secure memory portion 52. Hardware accelerator 48 can only access secure memory portion 54. All data that is directly accessed by hardware accelerator 48 is decrypted and stored in secure memory portion 54. Accelerator controller 44 decrypts the data with a key that has been provisioned to accelerator controller 44. When REE OS 34 requires control register access or access to secure memory portion 54, requests are provided to accelerator controller 44. Accelerator controller 44 runs in TEE user space and passes the register accesses to hardware accelerator 48 via relatively simple device driver 46. Accelerator controller 44 accepts data for TEE OS 42 from REE OS 34 and stores the data in secure memory portion 54.

Instead of allowing application 36 to access control registers 49, device driver 46, under the control of accelerator controller 44, executes control register accesses in the plurality of hardware accelerator control registers 49 on behalf of application 36. To provide the needed security for the confidential data, computations are performed on the confidential data using one or more compute kernels 50 executed in hardware accelerator 48. Device driver 38 in REE OS 34 may request that accelerator controller 44 write a control value to a specified register in the plurality of registers 49. Also, device driver 38 may request to read a specified register of the plurality of registers 49. Device driver 38 is allowed to request specified data be written to unsecure memory 52, request specified encrypted data be decrypted and written to secure memory portion 54, and to read specified data from secure memory portion 54.

Figure 3:
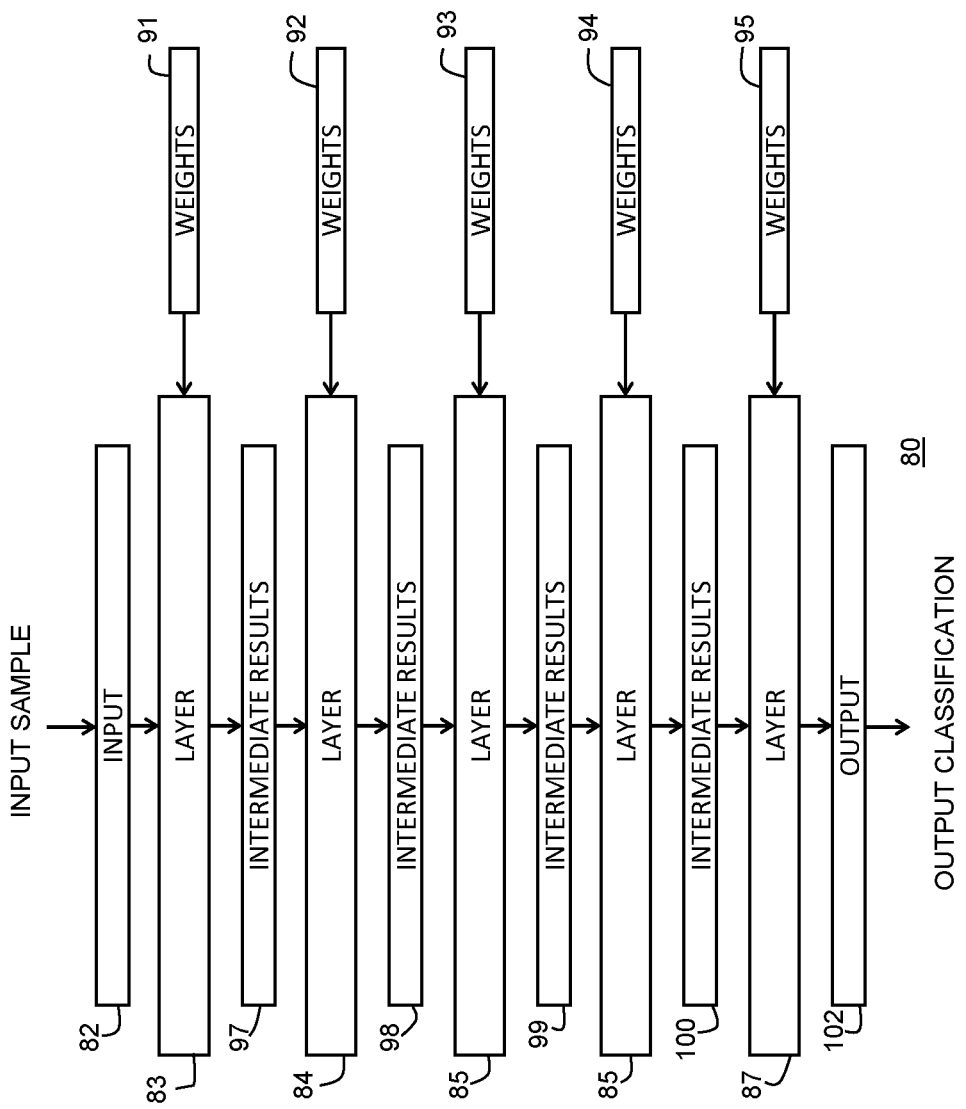
FIG. 3 illustrates a simplified machine learning network that may be protected using the described embodiment.

Accelerator controller 44 interprets control register write operations to hardware accelerator 48. This serves at least two purposes. First, addresses in the control stream that refer to data in unsecure memory portion 52 are replaced by addresses of data in secure memory 54. For example, an address to encrypted confidential data in unsecure memory portion 52 is replaced by a decrypted version in secure memory portion 54. Second, hardware accelerator 48 is given information regarding which compute kernels, if there are more than one, are executed on which confidential data. This information can be used to decide which confidential data can be returned to REE user space 32 if application 36 requests it, and which data should not be returned to REE user space 32 for security reasons. This prevents an attacker from requesting, for example, intermediate computation results that can be used to derive parts of the confidential data. This is discussed further in the discussion of FIG. 3. Accelerator controller 44 tracks whether data that is returned to REE user space 32 could reveal the confidential data, and that request may be refused to prevent such an attack. FIG. 3 illustrates an example of this in the context of a ML model. However, note that the illustrated embodiments may be applicable to other applications that use confidential data. For example, the application may be a complex financial application where the confidential data is sensitive financial information.

Generally, in one embodiment, a ML model may include a neural network having a plurality of nodes organized in layers with interconnections between the nodes. There are one or more inputs at a first layer and one or more outputs at a last layer. Each node may include a weight that is determined during training of the model. Calculations are performed at each layer with the weights until at the last layer, an output is provided. The output may be a classification of an input sample provided at the input. Intermediate results from each layer are provided to the next layer. The amount of time and effort that goes into training the ML model makes the ML model a valued asset that the owner of the model may want to protect from theft or copying.

FIG. 3 illustrates a simplified a ML network 80 that may be protected using the described embodiment. ML network 80 may be implemented using a neural network, and includes an input 82, layers 83-87, weights 91-95, and output 102. Each of layers 83-87 includes a plurality of nodes that are not shown. The nodes are interconnected between nodes in a previous layer and nodes in a subsequent layer. An input sample is provided for classification at input 82. Computations at the nodes for each of layers 83-87 uses weights 91-95 to produce intermediate results 97-100. After the last layer 87, an output is provided, which may be a classification of the input sample provided at input 82. The number of layers shown in FIG. 3 is only for discussion purposes and there may be many more layers in an implementation of a ML model. The nodes of layer 83 receive the input sample and weights 91 as inputs. The nodes of layer 83 perform calculations on the input sample using weights 91 to produce intermediate results 97. The intermediate results 97 are provided to the next layer 84, and more calculations are performed using weights 92 to produce intermediate results 98. Each layer in turn receives the intermediate results from the previous layer and performs computations using the corresponding weights until an output classification is determined and provided to output 102.

If an attacker has access to weights 91-95, the attacker may be able to reproduce, or clone, the ML model. Without knowing which compute kernels are executed on hardware accelerator 48 and on which data, the attacker could request the intermediate results and use the intermediate results to derive parts of the model, such as weights 91-95 used in the computations that were determined during training and considered important to protect. Therefore, by tracking the REE accesses to hardware accelerator 48 in accelerator controller 44, accelerator controller 44 can refuse the request from the REE and defeat the attack.

Accelerator controller 44 in TEE user space 40 has low complexity and is relatively small, which allows accelerator controller 44 to be implemented in TEE user space 40. The confidential data is stored encrypted in unsecure memory portion 52 so that application 36 cannot access it. The confidential data is only decrypted when stored in secure memory portion 54, which is not accessible to application 36. Accelerator controller 44 interprets and restricts write operations to the plurality of registers 49 to prevent an attacker from learning confidential data from, e.g., intermediate computation results from hardware accelerator 48.

Figure 4:
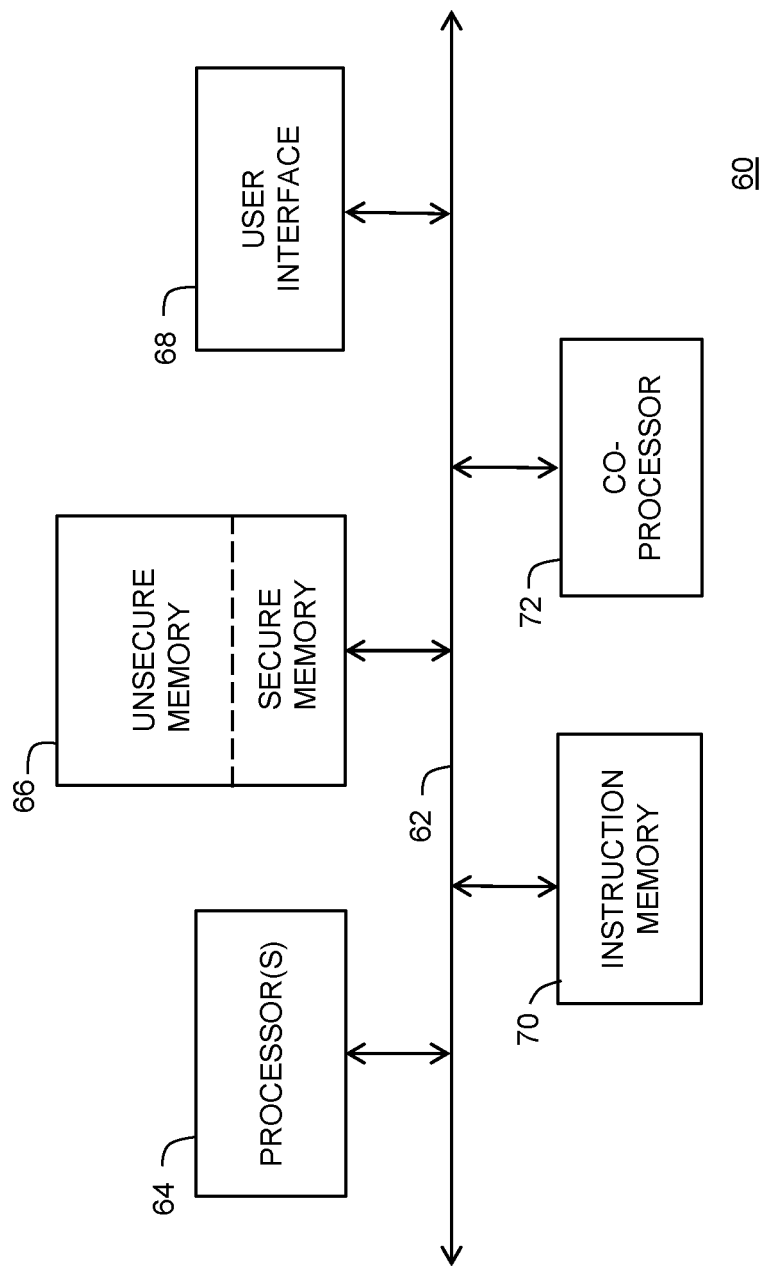
FIG. 4 illustrates a data processing system suitable for implementing the processing organization of FIG. 2.

FIG. 4 illustrates data processing system 60 suitable for implementing processing organization 30 of FIG. 2. Data processing system 60 may be implemented on one or more integrated circuits and may be used in an implementation of the described embodiments. Data processing system 60 may be used in, e.g., a data processing system for implementing a ML model application. Data processing system 60 includes bus 62. Connected to bus 62 is one or more processor(s) 64, memory 66, user interface 68, instruction memory 70, and co-processor 72. The one or more processor(s) 64 may include any hardware device capable of executing instructions stored in memory 66 or instruction memory 70. For example, processor(s) 64 may execute ML algorithms used for training and operating a ML model. Processor(s) 64 may be, for example, a microprocessor, field programmable gate array (FPGA), application-specific integrated circuit (ASIC), or similar device. An operating system may be implemented in code on processor(s) 64.

Memory 66 is partitioned into an unsecure memory portion and a secure memory portion as described above for memory 51, where the secure memory portion is more secure than the unsecure memory portion. In another embodiment, memory 66 may include two separate memories for providing the unsecure and secure portions. Memory 66 may be any kind of memory, such as for example, L1, L2, or L3 cache or system memory. Memory 66 may include volatile memory such as static random-access memory (SRAM) or dynamic RAM (DRAM), or may include non-volatile memory such as flash memory, read only memory (ROM), or other volatile or non-volatile memory. Also, the secure portion of memory 66 may be implemented in a secure hardware element or in a TEE. Alternatively, memory 66 may be a hard drive implemented externally to data processing system 60. In one embodiment, the secure portion of memory 66 may be used to store confidential data such as weights for an ML model.

User interface 68 may be connected to one or more devices for enabling communication with a user such as an administrator. For example, user interface 68 may be enabled for coupling to a display, a mouse, a keyboard, or other input/output device. Various other hardware or configurations for communicating are available.

Co-processor 72 is bi-directionally connected to bus 62. Co-processor 72 may be a special type of co-processor optimized for running encryption/decryption security software according to the RSA, ECC, or Advanced Encryption Standard (AES) or other type of commonly used encryption algorithm that may be used to encrypt and decrypt the confidential data stored in memory 66. Also, co-processor 72 may be used for the computations performed in hardware accelerator 48 or another part of data processing system 30.

Instruction memory 70 may include one or more machine-readable storage media for storing program code, or instructions, for execution by processor(s) 64 and/or co-processor 72. In other embodiments, both memories 66 and 70 may store data upon which processor(s) 64 may operate. Memories 66 and 70 may also store, for example, encryption, decryption, and verification applications.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. In a data processing system having a rich execution environment (REE) and a trusted execution environment (TEE), a method comprising:
executing an application in the REE;
storing data for the application in a secure memory accessible only by requests provided to the TEE, wherein the secure memory is more secure than an unsecure memory, and wherein only the TEE has access to the secure memory; and
executing a compute kernel in a hardware accelerator that operates on the data for the application using the hardware accelerator, wherein control of the compute kernel is provided by an accelerator controller in the TEE, wherein the compute kernel in the hardware accelerator makes requests to the accelerator controller when requiring access to the hardware accelerator, wherein the access to the hardware accelerator comprises the accelerator controller controlling access to a plurality of control registers in the hardware accelerator for storing control data for controlling operation of the hardware accelerator to protect intermediate computation results from the compute kernel in the hardware accelerator, wherein the accelerator controller interpreting write operations to the plurality of control registers of the hardware accelerator, and in response, replacing addresses in a control stream that refers to data stored in an unsecure memory with addresses of data stored in a secure memory, wherein the accelerator controller interpreting the write operations to the plurality of control registers of the hardware accelerator to determine whether to return the data operated on by the hardware accelerator to the unsecure memory or to the secure memory, and in response to determining the data is confidential, returning the data to the secure memory, and in response to determining the data is not confidential, returning the data to the unsecure memory, and wherein the intermediate computation results from the compute kernel are only stored in the secure memory.

2. The method of claim 1, wherein the application is a machine learning application.

3. The method of claim 1, further comprising:
storing the data for the application encrypted in the unsecure memory; and
decrypting the encrypted data for the application when storing the encrypted data for the application in the secure memory, wherein decrypting the encrypted data is performed using a key that has been provisioned to the accelerator controller.

4. The method of claim 1, further comprising:
accepting, by the accelerator controller, input data from the REE for the compute kernel; and
storing the input data in the secure memory.

5. The method of claim 4, further comprising selectively providing output data from the secure memory for storage in the unsecure memory.

6. A data processing system comprising:
a rich execution environment (REE) having a processor configured to execute an application;
a hardware accelerator, wherein a compute kernel is executed on the hardware accelerator, and wherein the compute kernel performs computations for the application;
a trusted execution environment (TEE), the TEE providing higher security than the REE, wherein the TEE includes an accelerator controller for controlling operation of the hardware accelerator, wherein access to the hardware accelerator comprises the accelerator controller controlling access to a plurality of control registers in the hardware accelerator for storing control data for controlling operation of the hardware accelerator to protect intermediate computation results of the hardware accelerator, wherein the accelerator controller interpreting write operations to the plurality of control registers of the hardware accelerator, and in response, replacing addresses in a control stream that refers to data stored in an unsecure memory portion with addresses of data stored in a secure memory portion, wherein the accelerator controller interpreting the write operations to the plurality of control registers of the hardware accelerator to determine whether to return the data operated on by the hardware accelerator to the unsecure memory portion or to the secure memory portion, and in response to determining the data is confidential, returning the data to the secure memory, and in response to determining the data is not confidential, returning the data to the unsecure memory; and wherein the intermediate computation results of the hardware accelerator are only stored in the secure portion of the memory; and a memory having the unsecure memory portion coupled to the REE and to the TEE, and the secure memory portion coupled to only the TEE, wherein the secure memory portion is more secure than the unsecure memory portion, and wherein confidential data to be accessed by the hardware accelerator is only stored in the secure memory portion.

7. The data processing system of claim 6, wherein the application is a machine learning application.

8. The data processing system of claim 6, wherein the application in the REE requests access to the plurality of control registers from the accelerator controller.

9. The data processing system of claim 6, wherein the accelerator controller accepts input data for the hardware accelerator and stores the input data in the secure portion of the memory, and wherein data output from the hardware accelerator is stored in either the unsecure portion of the memory or the secure portion of the memory by the accelerator controller.

10. The data processing system of claim 6, wherein the data used by the hardware accelerator is stored in the secure portion of the memory, and wherein the accelerator controller executes memory accesses to the secure portion of the memory on behalf of the hardware accelerator.

11. The data processing system of claim 10, wherein the accelerator controller determines if data read from the secure portion of the memory can be returned to the REE.

12. The data processing system of claim 11, wherein the read data is stored encrypted in the unsecure portion of the memory.

13. The data processing system of claim 12, wherein the encrypted read data is decrypted before being stored in the secure portion of the memory, and wherein a key for decrypting the encrypted read data is provisioned to the accelerator controller in the TEE.

* * * * *